United States Patent
Oku

[19]

[11] Patent Number: 6,097,121
[45] Date of Patent: Aug. 1, 2000

[54] SPINDLE MOTOR DESIGN FACILITATING AND ENSURING PRECISE ASSEMBLY OF THE MOTOR

[75] Inventor: Yoshito Oku, Osaka, Japan

[73] Assignee: Nidec Corporation, Kyoto, Japan

[21] Appl. No.: 09/110,089

[22] Filed: Jul. 2, 1998

[51] Int. Cl.$^7$ ........................................................ H02K 5/00
[52] U.S. Cl. ............................ 310/91; 310/42; 310/90; 310/67 R; 310/68 R; 310/258; 310/71
[58] Field of Search .................................. 310/42, 67 R, 310/68 R, 90; 360/98.07, 99.04, 99.07, 99.08; 384/107

[56] References Cited

U.S. PATENT DOCUMENTS

| | | |
|---|---|---|
| 4,636,677 | 1/1987 | Yasuhara . |
| 4,701,653 | 10/1987 | Merkle et al. . |
| 4,724,346 | 2/1988 | Klein et al. . |
| 4,961,017 | 10/1990 | Kakinoki et al. . |
| 5,120,091 | 6/1992 | Nakagawa ................................ 384/279 |
| 5,138,209 | 8/1992 | Chuta et al. . |
| 5,173,628 | 12/1992 | Yoshida et al. . |
| 5,173,814 | 12/1992 | Elsasser et al. . |
| 5,210,665 | 5/1993 | Nishizawa . |
| 5,274,288 | 12/1993 | Stefansky . |
| 5,291,358 | 3/1994 | Takahashi . |
| 5,325,004 | 6/1994 | Mori et al. . |
| 5,333,079 | 7/1994 | Takegami et al. . |
| 5,357,163 | 10/1994 | Minakuchi et al. . |
| 5,391,952 | 2/1995 | Simazu et al. . |
| 5,392,178 | 2/1995 | Nishio et al. . |
| 5,414,575 | 5/1995 | Katakura . |
| 5,434,729 | 7/1995 | Katakura et al. . |
| 5,452,156 | 9/1995 | Uda et al. . |
| 5,457,588 | 10/1995 | Hattori et al. . |
| 5,463,511 | 10/1995 | Nakano et al. . |
| 5,481,144 | 1/1996 | Dunfield et al. . |
| 5,516,212 | 5/1996 | Titcomb . |
| 5,552,650 | 9/1996 | Cap et al. . |
| 5,559,382 | 9/1996 | Oku et al. . |
| 5,885,005 | 3/1999 | Nakano et al. .......................... 384/113 |
| 5,914,832 | 6/1999 | Teshima .............................. 360/98.07 |

*Primary Examiner*—Elvin Enad
*Attorney, Agent, or Firm*—McCormick, Paulding & Huber LLP

[57] ABSTRACT

A spindle motor comprises a stationary member having a round mounting hole therein, a tubular member fitted into the mounting hole of the stationary member, a bearing means mounted to the inner side of the tubular member, a rotor supported by the bearing means for rotation in relation to the tubular member, a stator fitted onto the outer side of the tubular member, and a rotor magnet mounted to the rotor to be located radially and outwardly of the stator. The procedure of assembling the spindle motor includes mounting the rotor magnet to the rotor, joining the rotor by the bearing means to the tubular member for rotation, fitting the stator onto the tubular member, and fitting the tubular member into the mounting hole of the stationary member.

11 Claims, 7 Drawing Sheets

SPINDLE MOTOR DESIGN FACILITATING AND ENSURING PRECISE ASSEMBLY OF THE MOTOR

FIELD OF THE INVENTION

The present invention relates to a spindle motor for rotating disk recording mediums such as harddisks or optical disks.

DESCRIPTION OF THE PRIOR ART

A known spindle motor of a shaft rotation type for driving magnetic disks is constructed as illustrated in FIG. 14. As shown, a spindle motor 202 comprises a substantially circular bracket 204 to be mounted to a disk drive device, and a rotor 206 rotatable relative to the bracket 204. The bracket 204 is provided with a bearing support 208 at the cental portion thereof. A stator 210 is fitted onto the outer side of the bearing support 208. The rotor 206 has a cup-like hub 212 on which a magnetic disk is mounted and a shaft 214 depending from the center of the hub 212. The shaft 214 is rotatably mounted by a pair of ball bearings 216 and 218 to the inner side of the bearing support 208. An annular rotor magnet 220 is fixedly mounted on the inner side of a circumferential wall of the hub 212 in such a way that it is located opposite to and spaced by a small gap from the outer periphery of the stator 210. The bracket 204 is formed with through holes 222 at the positions opposite to the stator 210. A tubular lead bushing 224 made of an insulating material is accommodated in each of the through holes 222. Each lead wire 226 of the coils of the stator 210 is threaded through the lead bushing 224, led beneath the bracket 204, and welded by soldering to a given location on a flexible printed circuit board 228 which is bonded to the lower side of the bracket 204. A spacer 230 is interposed between the outer races of the two ball bearings 216 and 218.

The known spindle motor 202 is assembled by the following procedure. First, the lead bushings 224 are inserted into the through holes 222 of the bracket 204 and the flexible printed circuit board 228 is bonded to the lower side of the bracket 204, as shown in FIG. 15. The stator 210 is then lowered from above to fit onto the bearing support 208 of the bracket 204 and its coil leads 226 are threaded through the lead bushings 224 and soldered to the flexible printed circuit board 228. Also, the rotor magnet 220 is fixedly mounted to the inner side of the outer wall of the hub 212 of the rotor 206. The inner race of the upper bearing 216 is fitted onto a proximal end of the shaft 214 of the rotor 206. This is followed by insertion of the shaft 214 of the rotor 206 together with the upper bearing 216 into the bearing support 208 of the bracket 204, as shown in FIG. 15, until the outer side of the outer race of the upper bearing 216 is directly joined to the uppermost of the inner side of the bearing support 208. The spacer 230 and the lower bearing 218 are inserted from below to fit into the bearing support 208. While the inner race of the lower bearing 218 is urged upwardly under pressure, the lower bearing 218 is secured with its inner race to the end portion of the outer side of the shaft 214 and with its outer race to the lowermost portion of the inner side of the bearing support 218.

However, the above described structure of the spindle motor 202 has drawback in that it is susceptible to mis-alignment of parts in its assembly.

As seen from FIG. 15, when the rotor 206 is being mounted to the bracket 204, magnetic attractive force arises between the rotor magnet 220 and the stator 210 and may cause to tilt resulting in abutment of the rotor magnet 220 against the stator 210. If the rotor 206 this occurs, the rotor may vibrates securely during rotation. Also, the space between the rotor magnet 220 and the stator 210 may vary causing the bearings to receive uneven stresses and disabling stable rotation.

In addition, it is troublesome to thread the coil leads 226 of the stator 210 through the hole of the lead bushings 224. The smaller the size of the spindle motor, the more the job takes a time.

SUMMARY OF THE INVENTION

It is a primary object of the present invention to provide a motor structure which can be assembled smoothly and accurately.

It is another object of the present invention to provide a spindle motor which is free from mis-alignment due to tilting of a rotor relative to a stator during assembly.

It is a further object of the present invention to provide a spindle motor which can be assembled without being affected by the magnetic force between a rotor magnet and a stator coil.

It is a still further obejct of the present invention to provide a motor with which a lead wire derived from the coil of the stator can be easily threaded through a stationary bracket during the assembly of the motor.

Other objects and features of the present invention will be understood from the following description.

DETAILED DESCRIPTION OF THE PREFERRED EMBODIMENTS

The present invention will now be described in more detail referring to the accompanying drawings.

First, explanation will be made about a spindle motor according to a first embodiment of the present invention with reference to FIGS. 1 to 11.

Figure 1:
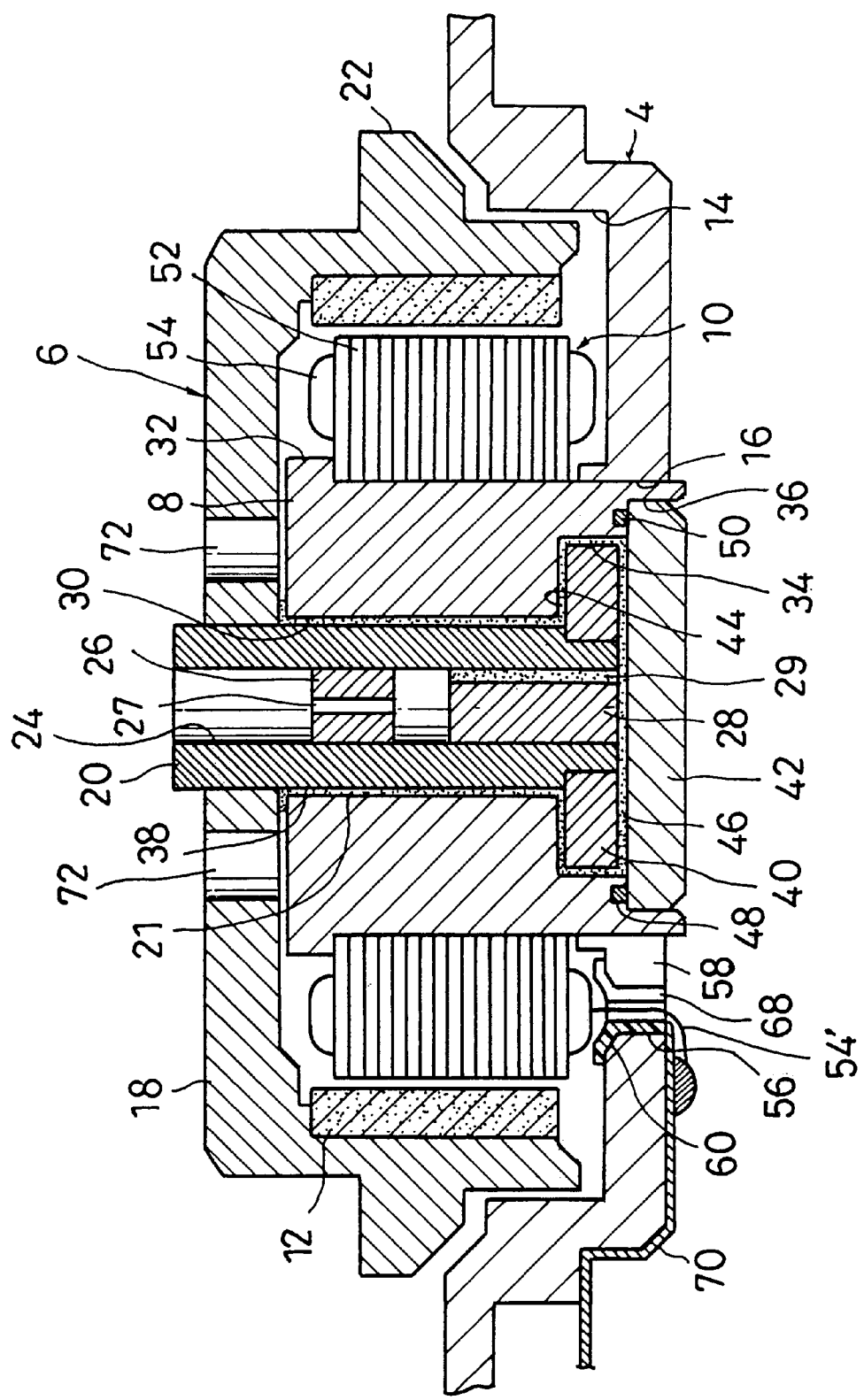
FIG. 1 is a schematic cross sectional view of the entire construction of a spindle motor according to a first embodiment of the present invention.
Figure 2:
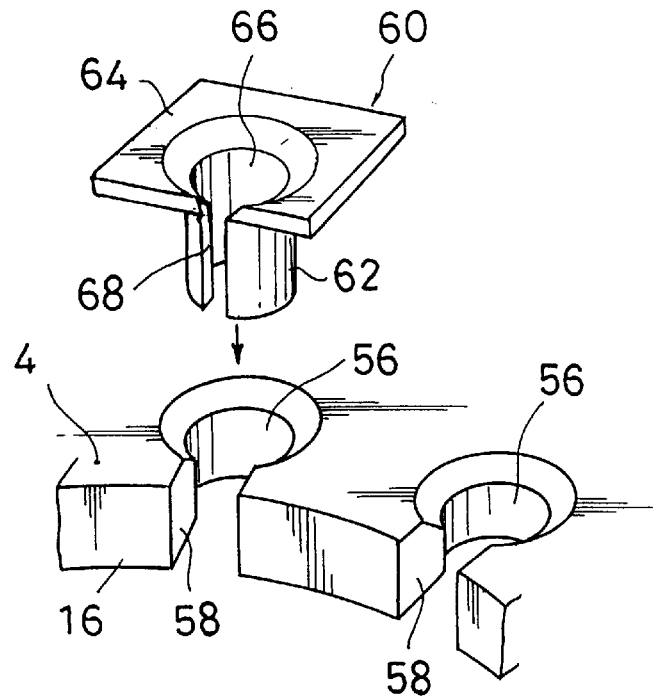
FIG. 2 is a partially exploded perspective view of a lead bushing and a corresponding bushing hole provided on a bracket of the spindle motor shown in FIG. 1.
Figure 3:
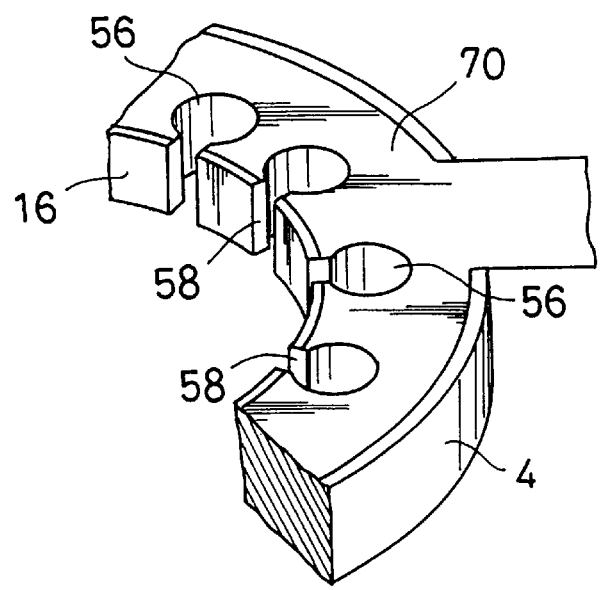
FIG. 3 is a perspective view pf a part of the bracket of the spindle motor shown in FIG. 1.

The spindle motor of the first embodiment is of a shaft rotation type having dynamic pressure bearing means. As shown in FIG. 1, a spindle motor 2 comprises a bracket 4 which is to be mounted on a disk drive device (not shown). A rotor 6 is arranged for rotation relative to the bracket 4. A tubular sleeve 8 fixedly mounted on the bracket 4 serves as a part of the dynamic pressure bearing means for supporting the rotor 6. A stator 10 is fixedly mounted on the sleeve 8, and an annular rotor magnet 12 is integrally coupled to the rotor 6.

The bracket 4 is substantially of a disk shape having a circular recess 14 which is concentric with the motor axis. A mounting hole 16 is provided in the center of the bracket 4 coaxially with the recess 14. The sleeve 8 is securely fitted at its lower end to the mounting hole 16 so that it stands upright on the bracket 4.

The rotor 6 comprises a rotor hub 18 made of a magnetic material such as stainless steel and a tubular shaft 20 fixed coaxially to the rotor hub 18 and made of e.g. stainless steel. The rotor hub 18 has an inverted cup-like shape opening downwardly with the shaft 20 projecting in the opening. The rotor magnet 12 is bonded by adhesive to the inner side of a circumferential wall of the rotor hub 18. The outer side of the circumferential wall of the rotor hub 18 is shaped to hold a magnetic disk (not shown). More specifically, the magnetic disk is held on a flange 22 provided on the circumferential wall of the rotor hub 18. The outer side of the tubular shaft 20 is finished very precisely to have a smooth bearing surface 21. The shaft 20 has a central bore 24 therein into which a first shaft sleeve 26 (best shown in FIG. 5) and a second shaft sleeve 28 (best shown in FIG. 6) are tightly fitted. The first sleeve 26 is located at the middle portion of the shaft 20 and has a through hole 27 axially formed in the center thereof for communicating to the outside air. The second shaft sleeve 28 is located at the lower portion of the shaft 20 and has a plurality (three in this embodiment) of axially extending, angularly equally spaced slots 29 on the outer surface thereof.

The sleeve 8 comprises a tubular member made of a copper alloy and having an inner surface which is finished highly precisely to provide a smooth bearing surface 30. The outer side of the sleeve 8 has a flange-like projection 32 provided on the uppermost thereof. The sleeve 8 is formed with a thrust recess 34 in a lower region of the inner side thereof. The thrust recess 34 has a greater diameter than the inner bearing surface 30. The sleeve 8 is formed with a cover receiving recess 36 provided below the thrust recess 34 at the lower end of the inner side of the sleeve 8. The cover receiving recess 36 has a greater inner diameter than the thrust recess 34. A predetermined small gap 38 is formed or left between the inner bearing surface 30 of the sleeve 8 and the outer bearing surface 21 of the shaft 20. The gap 38 is filled with an appropriate fluid lubricant. A herringbone groove (not shown) for producing a dynamic pressure is provided on either the inner bearing surface 30 of the sleeve 8 and/or the outer bearing surface 21 of the shaft 20. This permits the shaft 20 to be radially within the sleeve 8 by means of the dynamic pressure in the sleeve 8.

An annular thrust plate 40 is fixed to the lower end of the shaft 20 and accommodated in the thrust recess 34 of the sleeve 8. A disk-like thrust cover 42 is fitted to the cover accepting recess 36 of the sleeve 8 thus closing the inner hollow of the tubular sleeve 8 at its lower end. A small gap 44 is formed between the upper side of the thrust plate 40 and a lower surface of the sleeve 8 exposed to the thrust recess 34. Also, a small gap 46 is formed between the lower side of the thrust plate 40 and the upper side of the thrust cover 42. Both the gaps 44 and 46 are filled with the fluid lubricant. A herringbone or spiral groove for producing a dynamic pressure is formed on both or either of the two opposite surfaces that define the small gaps 44 and 46. This allows the shaft 20 to be supported by the fluid lubricant with pressure being caused therein by the rotation of the thrust plate relative to the sleeve 8 with the thrust plate being restrained at a given axial position. In addition, an annular groove 48 is formed on a lower surface of the sleeve 8 exposed to the cover accepting recess 36. An 0-ring 50 is fitted into the annular recess 48 for airtight sealing of the interface between the sleeve 8 and the thrust cover 42.

Figure 6:
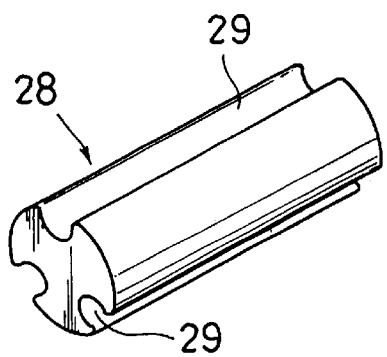
FIG. 6 is a perspective view of another type of shaft sleeve to be used in the spindle motor shown in FIG. 1.

As the second shaft sleeve 28 is located at the lower end position of the center bore 24 of the shaft 20, its slots 29 axially communicate the center bore 24 of the shaft 20 with the gap 44. The slots 29 of the second sleeve 28 are capable of holding an excess of the fluid lubricant lifted up by capillary action from the small gap 44 and thus act as a fluid lubricant storage. If required, the excess of the fluid lubricant stored in the slots 29 is fed to the dynamic pressure bearing means. As the through hole 27 of the first shaft sleeve 26 communicates the interior of the shaft 20 to the outside or atmosphere, the fluid lubricant is fed smoothly from the slots 29 to the dynamic pressure bearing means. Instead of forming the through hole 27 in the first shaft sleeve 26, a communicating aperture may be formed in a screw or retaining member (not shown) which is provided for fastening the upper end of the shaft 20. The aperture may not necessarily be a form of central hole but may be a slit or notch formed on the periphery of the screw or other retaining member. The slots 29 of the second shaft sleeve 28 are not limited to the configurations of the embodiment but may take any form so far as it functions as axially communicating channels in the outer side. The slots 29 of the second shaft sleeve 28 of FIG. 6 are preferably arranged in symmetry about the axis of rotation for balancing in the rotating movement of the shaft.

Figure 4:
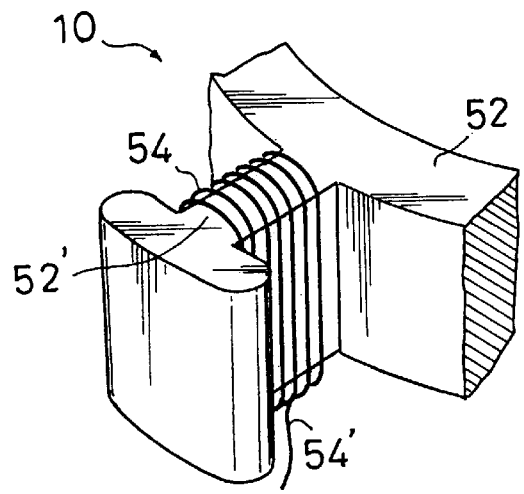
FIG. 4 is a partial perspective view of a part of a stator of the spindle motor shown in FIG. 1.
Figure 5:
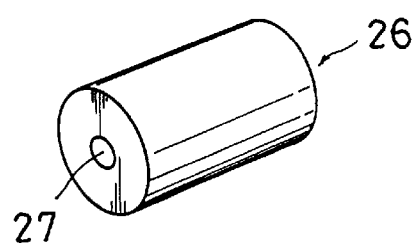
FIG. 5 is a perspective view of a shaft sleeve of the spindle motor shown in FIG. 1.

The stator 10 comprises, as shown in FIG. 4, a core 52 fixedly fitted on the outer side of the sleeve 8 and coils 54 wound on teeth 52' of the core 52. A coil lead 54' is derived from each of the coils 54. The stator 10 is radially spaced by a small gap from and arranged opposite to the rotor magnet 12.

The bracket 4 is formed with a group of coil lead passing slots 56 arranged at equal angular intervals adjacent to the mounting hole 16. Each of the coil lead passing slots 56 is communicated by a slit 58 to the mounting hole 16. A lead bush 60 which is made of an insulating material is fitted from above into the coil lead slot 56. The lead bush 60 comprises a tubular portion 62 fitted into the coil lead slot 56 and a flange-like retaining portion 64 formed integrally with the tubular member 62 at the top thereof. The tubular portion 62 allows the coil lead then lowered from above to fit onto the bearing support 208 54' to pass through a center hollow 66. The center hollow 66 is communicated with an axially extending opening 68 formed on the periphery of the tubular portion 62. The lead bush 60 is installed such that its opening 68 aligns with (the corresponding slit 58 of the bracket 4. Also, a flexible printed circuit board 70 is bonded to the lower side of the bracket 4. The coil leads 54' are threaded through their corresponding lead bushes 60 and are connected by soldering to corresponding terminals on the flexible printed circuit board 70.

Figure 7:
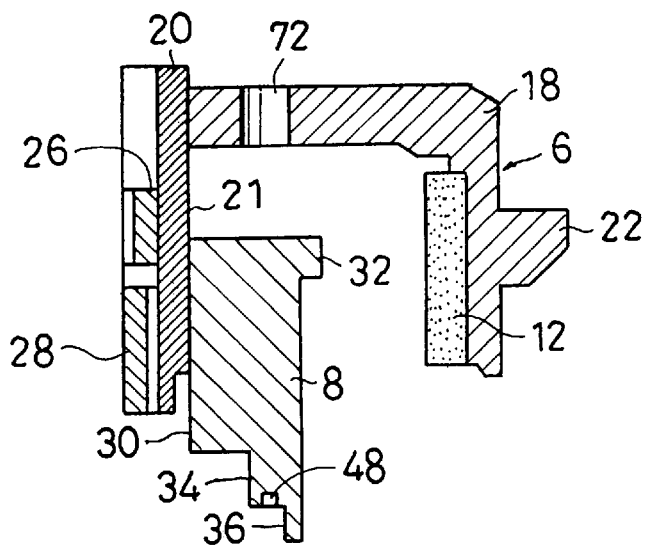
FIG. 7 is a partial cross sectional view showing a step for coupling a sleeve to a rotor in the spindle motor shown in FIG. 1.

A procedure of assembling the spindle motor 2 of the first embodiment will now be explained referring to FIGS. 7 to 11. The procedure starts with inserting the first shaft sleeve 26 and the second shaft sleeve 28 into the center hollow 24 of the tubular shaft 20 and joining the shaft 20 to the rotary hub 18 as shown in FIG. 7. The rotor magnet 12 is then fixedly mounted to the inner side of the circumferential wall of the rotor hub 18 in order to complete the rotor 6. The shaft 20 of the rotor 6 is fitted into the sleeve 8.

Figure 8:
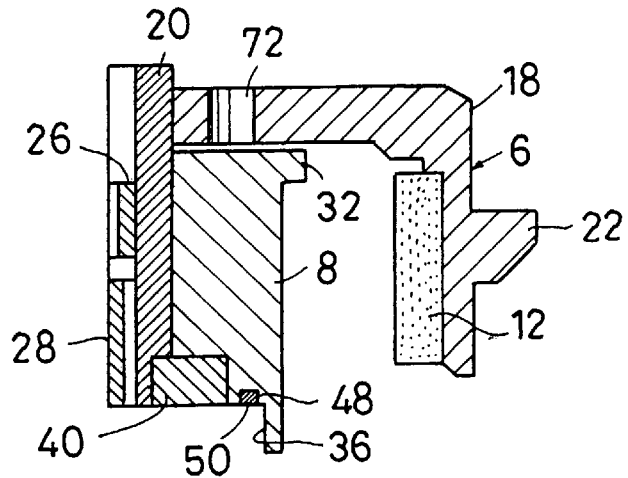
FIG. 8 is a partial cross sectional view showing a step for installing a thrust plate in the spindle motor shown in FIG. 1.
Figure 9:
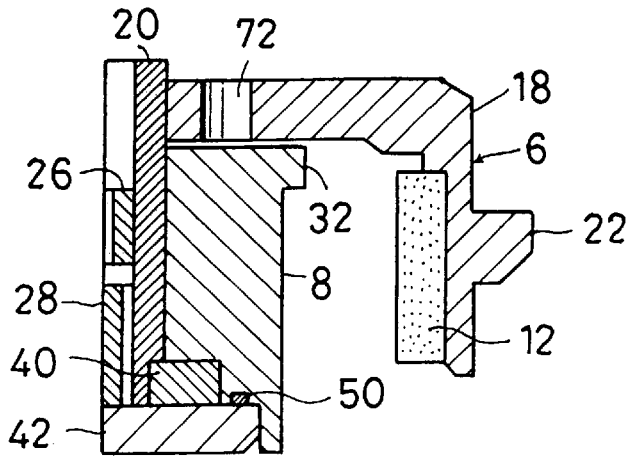
FIG. 9 is a partial cross sectional view showing a step for installing a thrust cover in the spindle motor shown in FIG. 1.
Figure 10:
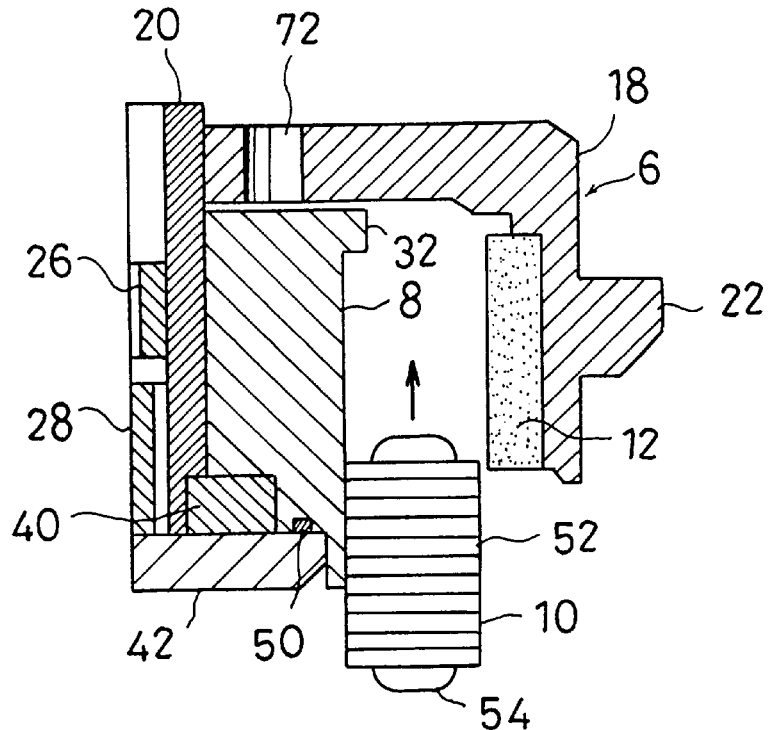
FIG. 10 is a partial cross sectional view showing a step for installing the stator in the spindle motor of FIG. 1.

Then, the thrust plate 40 is fixed to the lower end of the shaft 20 to restrain the sleeve 8, as shown in FIG. 8. At that time, the thrust plate 40 is seated in the thrust recess 34 of the sleeve 8. The O-ring 50 is also fitted into the annular groove 48 of the sleeve 8. This is followed by inserting the thrust cover 42 to a predetermined location in the cover accepting recess 36 of the sleeve 8 and securing it as shown in FIG. 9. Meanwhile, the small gaps 38, 44, and 46 are filled with the fluid lubricant prior to the installation of the thrust cover 42. This allows the rotor hub 18 to be rotatably supported by the dynamic pressure bearing means. The stator 10 with the coils 54 wound on its core 52 is then fitted onto the sleeve 8, as shown FIG. 10. When the upper side of the stator 10 has come into direct contact with the lower side of the flange-like projection 32 of the sleeve 8, the stator 10 is axially located in a correct position. Accordingly, the rotor magnet 12 on the rotor hub 18 is prevented from adverse engagement with the stator 10 during the installation regardless of magnetic interference between the rotor magnet 12 and the stator 10 and will provide no deflection of the rotor hub 18. As the shaft 20 of the rotor 6 is correctly fitted into the sleeve 8, the distance between the rotor magnet 12 and the stator 10 remains unchanged and uniform.

Figure 11:
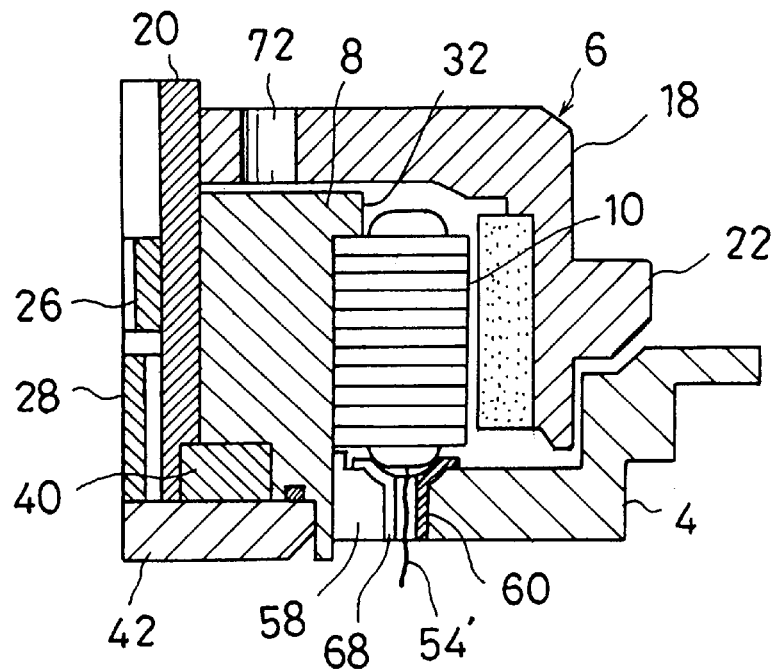
FIG. 11 is a partial cross sectional view showing a step for installing the bracket in the spindle motor of FIG. 1.

Meanwhile, lead bushes 60 are fitted into their corresponding coil lead passing slots 56 of the bracket 4 and the flexible printed circuit board 70 is bonded to the lower side of the bracket 4. Then, the lower end of the sleeve 8 carrying the rotor 6 is fitted into the mounting hole 16 of the bracket 4, as shown in FIG. 11. The fitting is carried out by pressing the sleeve 8 but not the rotor 6 towards the mounting hole 16. More particularly, a bar-like tool is inserted through a work aperture 72 provided in the rotor hub 18 opposite to the sleeve 8, and pressed against the sleeve 8 so that the sleeve 8 is fitted into the mounting hole 16. During the fitting of the sleeve 8 into the mounting hole 16, the coil leads 54' extending from the stator 10 across the mounting hole 16 which is communicated with the lead passing slots 56 of the bracket 4 and the lead bushes 60 installed in the slots 56. The coil leads are shifted from the mounting hole 16 through the slots 58 and the axial openings 68 into the center hollows 66 of the corresponding lead bushes 60. As the coil leads 54' pass through the center hollows 66 of the corresponding lead bushes 60, they are easily drawn out from the bracket 4. The coil leads 54' are finally connected by soldering to the flexible printed circuit board 70.

The spindle motor 2 of the first embodiment has the following significant advantages.

When the stator 10 is mounted to the sleeve 8 which services as a stationary member, the stator 10 is inserted axially and inwardly from the lower opening of the rotor hub 18 with the stator being moved along the outer side of the sleeve 8 and secured at a position upon its coming into contact with the flange-like projection 32. This allows the stator 10 to be affected as little as possible by the magnetic interference between the rotor hub 18 and the rotor magnet 12 on the rotor hub 18 while the stator 10 is being installed and anchored to the stationary member or sleeve 8, thereby insuring precise assembly. The stator 10 is to be mounted on the sleeve 8 which has been coupled with the rotor 6 in advance to support it. The rotor 6 is hence free from the magnetic interference and remains for highly accurate rotation since the rotor 6 has been supported precisely even if the stator 10 is affected by the magnetic interference of the rotor hub 18 and the rotor magnet 12 on the rotor hub 18. The coil leads 54' of the stator 10 are easily drawn out because the lead passing slots 56 of the bracket 4 and the lead bushings 60 installed in the slots 56 are communicated through the slots 58 and the axial openings 68 to the mounting hole 16. This will increase the quality and efficiency of assembly work. Particularly, this embodiment employs the dynamic bearing means provided with the storage of the fluid lubricant and will provide highly accurate, life-long bearing functions and thus smooth rotating actions.

Figure 12:
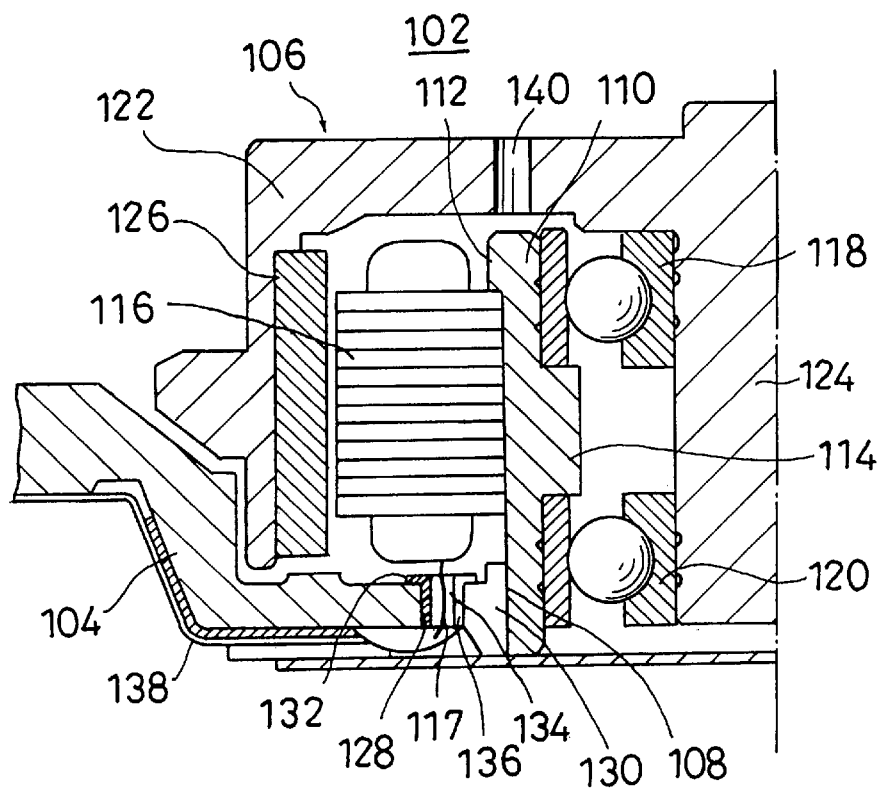
FIG. 12 is a partial cross sectional view of a spindle motor according to a second embodiment of the present invention.

A spindle motor according to a second embodiment of the present invention will be described referring to FIG. 12.

The second embodiment is the spindle motor 102 of shaft rotation type using ball bearings as the bearing means. The spindle motor 102 includes a substantially circular bracket 104 mounted to a disk drive and a rotor 106 arranged for rotation in relation to the bracket 104. The bracket 104 has a round mounting hole 108 provided in the center thereof and a separate tubular bearing support 110 is fitted at the lower end into the mounting hole 108. The bearing support 110 has a flange-like projection 112 provided on the upper end of the outer side thereof and an inwardly projecting land 114 provided on a center of the inner side thereof. A stator 116 is fitted onto the outer side of the bearing support 110 as positioned with the flange-like projection 112. A pair of ball bearings 118 and 120 are fitted to the inner side of the bearing support 110 at both upper and lower ends respectively as positioned with the land 114.

The rotor 106 comprises a cup-like rotor hub 122 on which a magnetic disk is mounted and a shaft 124 extending from the center of the rotor hub 122. The shaft 124 is rotatably joined by a pair of ball bearings 118 and 120 to the inner side of the bearing support 110. An annular rotor magnet 126 is fixedly mounted to the inner side of a circumferential wall of the rotor hub 122. The rotor magnet 126 is spaced by a small gap from and located opposite to the outer side of the stator 116.

A group of lead passing slots 128 corresponding to coil leads 117 from the stator 116 are provided in the bracket 104 at equal intervals about and adjacent to the mounting hole 108. Each of the lead passing slots 128 is communicated through an axially extending slit 130 to the mounting hole 108. A lead bushing 132 made of an insulating material is fitted into the lead passing slot 128. The lead bushing 132 comprises a tubular body inserted into the lead passing slot 128 and a flange provided at the upper end of the tubular body. A center hollow 134 is provide across the tubular body. The lead bushing 132 has an axially extending opening 136 provided in the tubular body thereof. The center hollow 134 is hence communicated through the opening 136 and the slit 130 to the mounting hole 108 of the bracket 104. A flexible printed circuit board 138 is bonded to the lower side of the bracket 104.

A procedure of assembling the spindle motor 102 of the second embodiment will now be explained.

The procedure starts with mounting the rotor magnet 126 to the rotor hub 122, fitting the inner race of the upper ball bearing 118 onto the upper end of the shaft 124, and inserting the shaft 124 from above into the bearing support 110 to join the outer race of the upper bearing 118 directly to the bearing support 110. The lower bearing 120 is inserted from below into the bearing support 110 so that its outer race is directly joined to the bearing support 110 and its inner race to the lower end of the shaft 124. The two ball bearings 118 and 120 are bonded by means of adhesives under pressure. Accordingly, the rotor 106 is rotatably linked by the two ball bearings 118 and 120 to the bearing support 110.

This is followed by fitting from the opening of the rotor hub 122 the stator 116 onto the outer side of the bearing support 110 carrying the rotor 106. As the stator 116 is inserted along the outer side of the bearing support 110 into the rotor 106 which remains rotatably supported with the bearing support 110 without any deflection, it is prevented from directly engaging with the rotor magnet 126. This will minimize the magnetic interference between the stator 116 and the rotor magnet 126. The stator 116 is positioned when it comes into contact with the flange-like projection 112 of the bearing support 110.

Meanwhile, the lead bushings 132 are fitted into their respective lead passing slots 128 of the bracket 104 and the flexible printed circuit board 138 is bonded to the lower side of the bracket 104. Then, the lower end of the bearing support 110 carrying the rotor 106 is fitted under pressure into the mounting hole 108 of the bracket 104. The pressure fitting of the bearing support 110 into the mounting hole 108 is carried out by inserting a bar-like tool into a work hole 140 provided in the upper side of the rotor hub 122 and pressing it against the bearing support 110. Before the fitting of the bearing support 110 into the mounting hole 108, the coil leads 117 extending from the stator 116 across the mounting hole 108 are shifted from the mounting hole 108 through the slots 130 and the axial openings 136 into the center hollows 134 of the corresponding lead bushings 132 for drawing out. When the bearing support 110 has been fitted into the mounting hole 108, the coil leads 117 are connected by soldering to the flexible printed circuit board 138.

In the spindle motor 102 of the second embodiment similar to the first embodiment, the stator 116 and the rotor 106 are coupled to each other without direct engagement between the stator 116 and the rotor magnet 126 hence increasing the quality and efficiency of assembly operation. Also, the coil leads 117 of the stator 116 can easily be drawn out thus encouraging the assembly operation.

Figure 13:
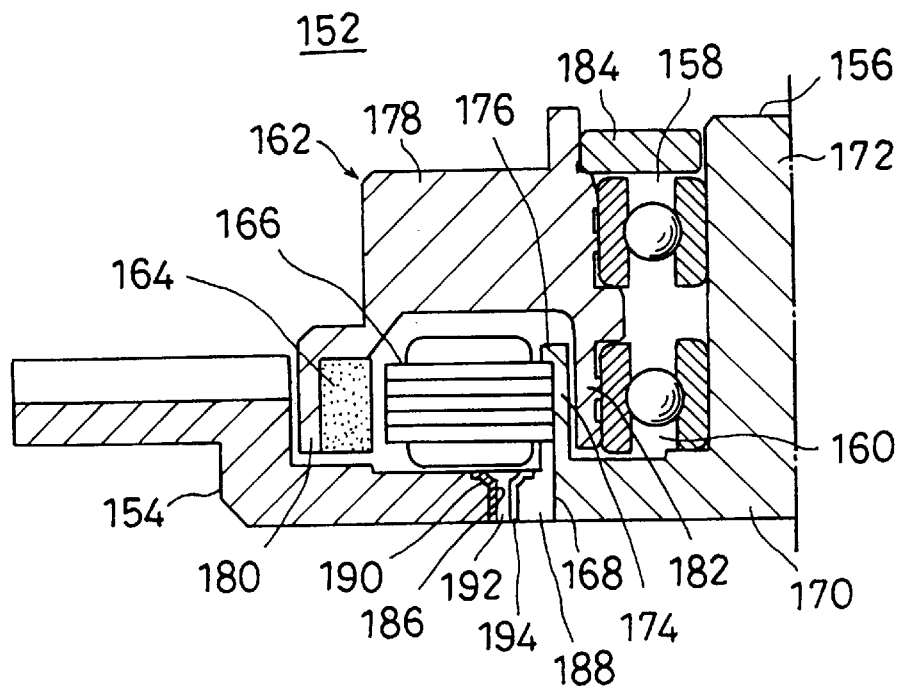
FIG. 13 is a partial cross sectional view of a spindle motor according to a third embodiment of the present invention.
Figure 14:
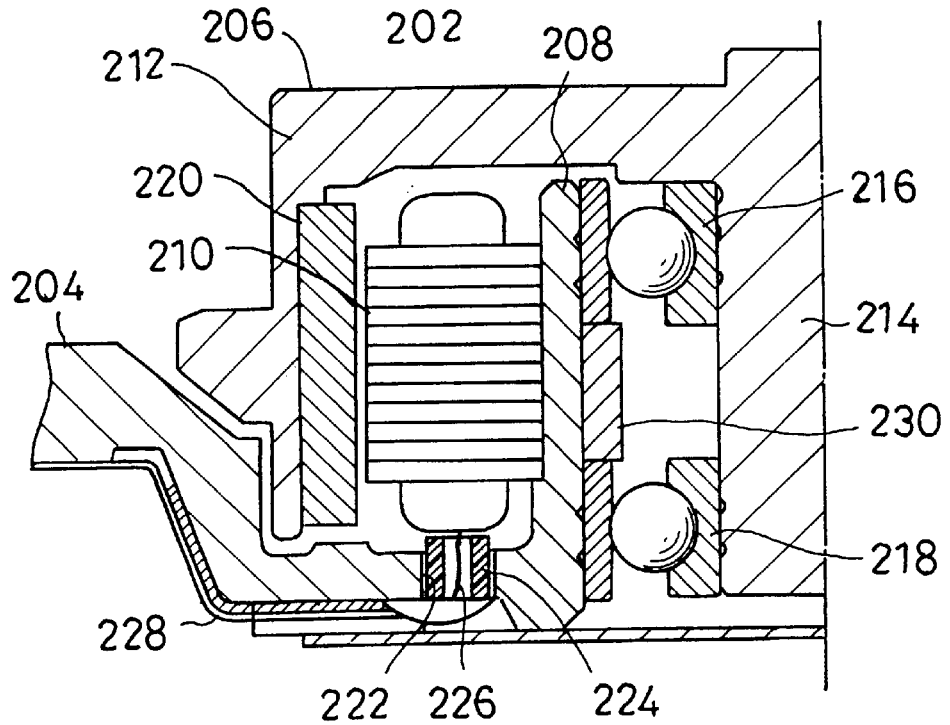
FIG. 14 is a partial cross sectional view of a conventional spindle motor.
Figure 15:
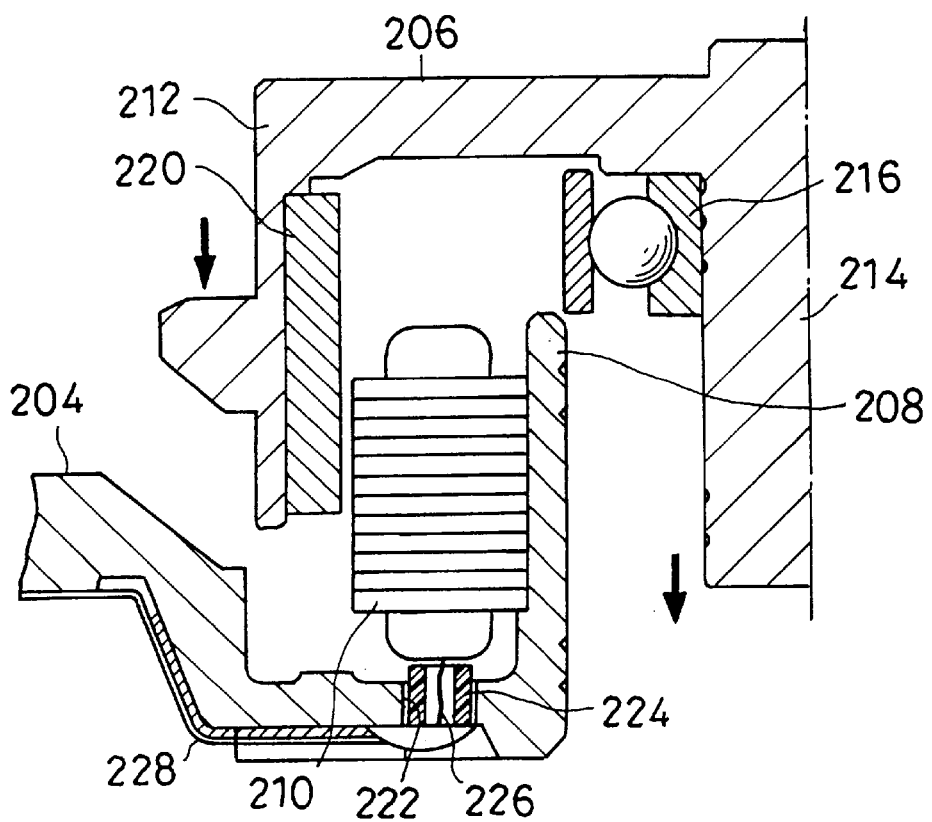
FIG. 15 is a partial cross sectional view showing a step for assembling the spindle motor of FIG. 14.

A spindle motor according to a third embodiment of the present invention will be described referring to FIG. 13.

The spindle motor 152 of the third embodiment is of a stationary shaft type using ball bearing means. The spindle motor 152 includes a substantially circular bracket 154 mounted to a disk drive, a stationary shaft 156 provided integral with the bracket 154 in the center, a rotor 162 rotatably supported via a pair of ball bearings 158 and 160 by the shaft 156, an annular rotor magnet 164 mounted to the rotor 162, and a stator 166 provided integral with the bracket 154. The outer side of the stator 166 is spaced by a small gap from and located opposite to the inner side of the rotor magnet 164.

The bracket 104 has a round mounting hole 168 provided in the center thereof. The shaft 156 comprises a disk-shaped bottom plate 170, a capstan 172 vertically extending from the center of the bottom plate 170, and a cylinder 174 extending upwardly from the outer edge of the bottom plate 170. The bottom plate 170 is fitted into the mounting hole 168 of the bracket 154. A flange-like projection 176 is provided on the upper end of the cylinder 174.

The rotor 162 includes a rotor hub 178 made of a magnetic material such as stainless steel and an outer cylinder 180 extending downwardly from the outer edge of the rotor hub 178. A rotor magnet 164 is bonded by adhesive to the inner side of the outer cylinder 180. The upper ball bearing 158 is mounted to the inner side of the rotor hub 178 and the lower ball bearing 160 to the inner side of an inner cylinder 182 extending downwardly from the inner edge of the rotor hub 178. An annular labyrinth cap 184 is fitted into the upper end of the inner side of the rotor hub 178. The inner side of the labyrinth cap 184 is spaced by a small gap from and located opposite to the upper end of the outer side of the stationary shaft 172 hence forming a labyrinth sealing structure. The labyrinth cap 184 is located above the upper ball bearing 158 or at the motor outward side for preventing unwanted dirt of e.g. grease from escaping from the ball bearings 158 and 160 to the outside of the motor 152. The inner cylinder 182 of the rotor hub 178 is radially spaced by a small gap from and arranged opposite to the cylinder 174 of the shaft 156, forming another labyrinth sealing structure.

A group of lead passing slots 186 are provided in the bracket 154 about and adjacent to the mounting hole 168. Each of the lead passing slots 186 is communicated through a slit 188 to the mounting hole 168. A lead bushing 190 made of an insulating material is fitted into the lead passing slot 186. The lead bushing 190 has an axially extending center hollow 192 provided therein and an axially extending opening 194 thereof so that the center hollow 192 is communicated with the slit 188.

A procedure of assembling the spindle motor 152 of the third embodiment will now be explained.

The procedure starts with mounting the rotor magnet 164 to the rotor hub 178 and rotatably joining the shaft 156 by the two ball bearings 158 and 160 to the stationary shaft 172.

Then, the stator 166 is inserted from the opening side of the rotor hub 178 and fitted onto the outer side of the cylinder 174 of the shaft 156 carrying the rotor 162. As the stator 166 is inserted along the outer side of the shaft 156 into the rotor 162 which remains supported securely with the shaft 156 with no deflection, it is prevented from direct engagement with the rotor magnet 164. This will minimize the magnetic interference between the stator 166 and the rotor magnet 166. The stator 166 is positioned when it comes into direct contact with the flange-like projection 176 of the cylinder 174.

Meanwhile, the lead bushings 190 are fitted into their respective lead passing slots 186 of the bracket 154. The lower end or the outer side of the bottom plate 170 of the shaft 156 carrying the rotor 162 is fitted under pressure into the mounting hole 168 of the bracket 154. The pressure fitting of the shaft 156 into the mounting hole 168 is conducted by directly pressing the upper side of the stationary shaft 172. Before the fitting the shaft 156 into the mounting hole 168, coil leads extending from the stator 166 are shifted from the mounting hole 168 through the slits 188 and the openings 194 into the center hollows 192 of the lead bushings 190 for drawing out.

In the spindle motor 152 of the third embodiment similar to the first or second embodiment, the stator 166 and the rotor 162 are coupled to each other without direct engagement between the stator 166 and the rotor magnet 164 hence increasing the quality and efficiency of assembly operation. Also, the coil leads of the stator 166 can easily be drawn out thus encouraging the assembly operation.

It is understood that the present invention is not limited to the spindle motors of the foregoing embodiments but other changes and modifications are possible without departing the scope of the present invention. For example, the present invention is applicable with equal success to a base-mounted type spindle motor in which a rotor is supportedly joined by bearing means to the base plate of a magnetic disk drive, as compared with the prescribed spindle motor of which bracket is mounted as the stationary member to the base plate of a magnetic disk drive.

What is claimed is:

1. A spindle motor having a stationary member, a bearing means mounted to the stationary member, a rotor rotatably coupled by the bearing means to the stationary member, an annular stator mounted to the stationary member radially outwardly of the bearing means, and an annular rotor magnet mounted to the rotor so that it is radially outwardly spaced by a small distance from and arranged opposite to the stator, wherein:

the stationary member includes a round mounting hole which is arranged coaxially with the rotor and the diameter which is equal to the inner diameter of the stator;

the stationary member also includes a tubular member which has an outer diameter substantially equal to the diameter of the mounting hole and which is coupled at its inner side with the bearing means so that the rotor is rotatably supported via the bearing means by the tubular member;

the stator is fitted onto the outer side of the tubular member which rotatably supports the rotor, and the tubular member is fitted at one end into the mounting hole and thus secured to the stationary member;

the bearing means comprises the tubular member and a dynamic pressure bearing defined by a shaft mounted in the interior thereof for rotation in relation thereto, either the inner side of the member or the outer side of the shaft having a groove for producing radial dynamic pressure;

the rotor comprises the shaft and an inverted a cup-like rotor hub fixedly mounted to the shaft with the rotor magnet joined to the inner side of a circumferential wall of the rotor;

the tubular member has a thrust recess with an inner diameter greater than the inner diameter of the interior of the member and a cover accepting recess with an inner diameter greater than the inner diameter of the thrust recess, both provided in the inner side thereof and aligned axially with each other, the cover accepting recess opening to the lower end of the tubular member; and a thrust plate is fitted into the thrust recess and secured to the lower end of the shaft and a thrust cover is fitted into the cover accepting recess to close the tubular member; a groove for producing a dynamic thrust being provided either on both axial sides of the thrust plate or the inner sides of the tubular member and thrust cover.

2. A spindle motor comprising:

A rotatable shaft;

a cylindrical sleeve member surrounding the shaft and having a flange formed on an upper end portion of an outer peripheral surface thereof;

a rotor including a disk-shaped upper wall fixed to the shaft and having a plurality of access holes formed at portions axially opposing the sleeve member so as to expose a part of the top portion of the sleeve member, and a cylindrical wall depending from the outer peripheral portion of the upper wall;

a bearing means interposed between the sleeve member and the shaft so as to support the rotor for rotation;

an annular stator including a core having a plurality of teeth portions and a plurality of coils respectively wound around the teeth portions, the annular stator being mounted on the outer peripheral surface of the sleeve member so as to be in contact with the flange in an axial direction for positioning the stator;

an annular rotor magnet attached to the inner peripheral surface of the cylindrical wall of the rotor so that the stator and the rotor magnet face each other through a small radial gap;

a base member formed with a central opening for fixedly receiving the sleeve member coaxially with each other, the base member further provided with a plurality of slots formed in the vicinity of the central opening for receiving the wires of the coils and a plurality of slots communicating between the central opening and the slots;

a plurality of hollow tubular bush members made of an insulating resin and inserted respectively into the slots; and a flexible printed circuit board attached to a lower surface of the base member, the wires of the coils being led from the stator through the tubular bush members in the slots and electrically connected to the printed circuit board.

3. A spindle motor according to claim 2, wherein each tubular bush member includes a hollow tubular portion and a flange integrally formed with the tubular portion at the top thereof, the bush members further include an opening aligning with the corresponding slit of the base member so as to communicate between an interior of the bush member and the central opening.

4. A spindle motor according to claim 2, wherein an outer peripheral surface of the rotational shaft and an inner peripheral surface of the sleeve member radially oppose each other with a narrow gap therebetween filled with lubricating fluid, a hydrodynamic pressure generating groove being formed on at least one opposing surface of the rotational shaft and the sleeve member for generating hydrodynamic pressure during rotation of the rotor for bearing radial load of the rotor;

a disk-like thrust plate fixed on a lower end portion of the rotatable shaft and a disk-like thrust bush fixedly fitted on the inner peripheral surface of the sleeve member so as to axially oppose the thrust plate through a narrow gap filled with lubricating fluid, a hydrodynamic pressure generating groove being formed on at least one opposing surface of the thrust plate and the thrust bush for generating hydrodynamic pressure during rotation of the rotor for bearing the thrust load of the rotor.

5. A spindle motor according to claim 4, wherein the rotatable shaft has a through hole extending axially and an oil reservoir is formed at one end portion of the hole so as to retain lubricating fluid by capillary action.

6. A spindle motor according to claim 5, wherein a columnar member having a plurality of slots extending in the axial direction is inserted in the through hole, a plurality of channels formed between an inner surface of the through hole and the slots is provided within the through hole so as to form the oil reservoir.

7. A spindle motor according to claim 6, wherein the small gaps between the inner side of the tubular member and the outer side of the shaft, between the thrust recess side of the tubular member and the thrust plate and the thrust cover are filled with a fluid lubricant.

8. A spindle motor according to claim 7, wherein the shaft has a hollow center provided at one side with a storage region for saving a portion of the fluid lubricant by the effect of capillary action.

9. A spindle motor according to claim 8, wherein a shaft sleeve is fitted into the center hollow of the shaft and a plurality of axially extending grooves are provided in either the inner side of the hollow shaft or the outer side of the shaft sleeve for holding a portion of the fluid lubricant by the capillary action.

10. A spindle motor according to claim 2, wherein a pair of ball bearings is interposed between an outer peripheral surface of the shaft and an inner peripheral surface of the sleeve member for rotatably supporting the rotational shaft.

11. A spindle motor according to claim 10, wherein an annular projection is formed on the inner peripheral surface of the sleeve member for positioning the ball bearings in the axial direction.

* * * * *

UNITED STATES PATENT AND TRADEMARK OFFICE
CERTIFICATE OF CORRECTION

PATENT NO. : 6,097,121
DATED : August 1, 2000
INVENTOR(S) : Yoshito Oku

It is certified that error appears in the above-identified patent and that said Letters Patent is hereby corrected as shown below:

On the Title Page

[30] Foreign Application Priority Data
October 6, 1995   [JP]   Japan         7-286484

[62] Related U.S. Application Data
Division of application No. 08/725,977, Oct. 4, 1996,
Pat. No. 5,831,355

Signed and Sealed this

Twenty-fourth Day of April, 2001

Attest:

NICHOLAS P. GODICI

Attesting Officer

Acting Director of the United States Patent and Trademark Office